United States Patent
Shikata et al.

(10) Patent No.: US 7,993,440 B2
(45) Date of Patent: *Aug. 9, 2011

(54) INKJET INK

(75) Inventors: Yoshiaki Shikata, Tomi (JP); Nami Hatakeyama, Tomi (JP); Isao Tabayashi, Tomi (JP)

(73) Assignee: Mimaki Engineering Co., Ltd., Nagano (JP)

( * ) Notice: Subject to any disclaimer, the term of this patent is extended or adjusted under 35 U.S.C. 154(b) by 292 days.

This patent is subject to a terminal disclaimer.

(21) Appl. No.: 12/240,491

(22) Filed: Sep. 29, 2008

(65) Prior Publication Data

US 2009/0139431 A1   Jun. 4, 2009

(30) Foreign Application Priority Data

Dec. 3, 2007 (JP) ................. 2007-311945

(51) Int. Cl.
*C09D 11/02* (2006.01)
(52) U.S. Cl. .................. 106/31.58; 106/31.86
(58) Field of Classification Search ........... 106/31.57, 106/31.58, 31.85, 31.86; 524/563
See application file for complete search history.

(56) References Cited

U.S. PATENT DOCUMENTS

| | | | | |
|---|---|---|---|---|
| 4,975,117 A * | 12/1990 | Tabayashi et al. | ......... | 106/31.58 |
| 5,091,004 A * | 2/1992 | Tabayashi et al. | ......... | 106/31.57 |
| 7,125,447 B2 * | 10/2006 | Sugita et al. | ............. | 106/31.58 |
| 7,156,909 B2 * | 1/2007 | Oyanagi et al. | ............ | 106/31.58 |
| 2005/0215664 A1 * | 9/2005 | Elwakil et al. | ............. | 523/160 |
| 2008/0173214 A1 * | 7/2008 | Oyanagi et al. | ............ | 106/31.25 |
| 2008/0281043 A1 * | 11/2008 | Furuhata et al. | ........... | 525/54.42 |
| 2009/0029049 A1 * | 1/2009 | Furuhata et al. | ........... | 427/256 |
| 2009/0139432 A1 * | 6/2009 | Shikata et al. | ............. | 524/563 |
| 2009/0143509 A1 * | 6/2009 | Shikata et al. | ............. | 524/563 |

FOREIGN PATENT DOCUMENTS

JP    2005-330460    12/2005

OTHER PUBLICATIONS

Dimethyl ether article; 6 pages; no date available.*

* cited by examiner

*Primary Examiner* — Helene Klemanski
(74) *Attorney, Agent, or Firm* — Ditthavong Mori & Steiner, P.C.

(57) ABSTRACT

A non-water-based inkjet ink containing a colorant, is characterized in that a mixed solvent having a solubility parameter value of from about 8 to about 10 is used as a solvent. The ink is an inkjet ink of which solvent hardly erodes a head member so as to allow long term stable printing and also hardly penetrates the material of media so as to improve the printing quality.

2 Claims, No Drawings

INKJET INK

CROSS-REFERENCE TO RELATED APPLICATION

The present application claims priority to Japanese Patent Application No. 2007-311945, filed on Dec. 3, 2007, the entire contents of which are herein incorporated by reference.

BACKGROUND OF THE INVENTION

1. Field of the Invention

The present invention relates to an ink for inkjet printing.

2. Discussion of the Background

Various inkjet recording methods have been proposed, for example, a method of utilizing electrostatic attraction to eject ink droplets (so-called electric-field control method), a method of utilizing vibration pressure of a piezoelectric element to eject ink droplets (so-called drop-on-demand method (pressure pulse method)), and a method of utilizing pressure which is generated by forming and developing air bubbles with high temperature (so-called thermal inkjet method). These methods allow extremely high-definition images to be obtained.

These inkjet recording methods typically use water-based inks using water as the main solvent and oil-based inks using organic solvent as the main solvent. Generally, images printed using a water-based ink have poor water resistance, while oil-based ink can provide images having excellent water resistance.

Various inkjet inks have been developed and used. For example, there is known an inkjet ink using vinyl chloride-vinyl acetate copolymer resin (e.g., JP-A-2005-330460). In the inkjet ink using the vinyl chloride-vinyl acetate copolymer resin, a solvent such as NMP (N-methylpyrrolidone) solvent, a lactone solvent, and cyclohexane is used for dissolving the vinyl chloride-vinyl acetate copolymer resin (see, for example, column [0021] of JP-A-2005-330460). However, these solvents may erode a head member so as to cause problems such as life shortening of the head and decline in printing quality. Further, the NMP solvent or the like has a tendency to remain in the media, thus causing another problem such as penetration of the media and reduction in drying property.

Thus, there is a need for a non-water-based inkjet ink having good drying property to reduce the possibility of blocking while preventing penetration of material of media.

SUMMARY OF THE INVENTION

The present invention advantageously provides a non-water-based inkjet ink containing a colorant, wherein a mixed solvent having a solubility parameter value of from about 8 to about 10 is used as a solvent.

The present invention further advantageously provides that the mixed solvent is one or a mixture of two or more selected from solvents represented by the following general formulas:

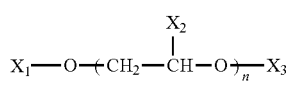

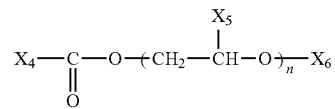

in the above formulas (1), (2), each of $X_1$ through $X_6$ is H or an alkyl group, and n is 1 or 2.

The present invention also advantageously provides that the mixed solvent is a combination of solvents.

The present invention additionally advantageously provides that the combination of solvents is diethylene glycol hexylether and propylene glycol monomethyl ether acetate.

The present invention still further advantageously provides that the inkjet ink contains vinyl chloride-vinyl acetate copolymer resin as a resin.

DETAILED DESCRIPTION OF EXEMPLARY EMBODIMENTS OF THE INVENTION

Embodiments of the present invention will be described hereinafter.

Inventors of the present invention aimed at improving the printing quality and improving the drying property by finding a combination of solvents which is not of a strong type of dissolving the resin like the conventional one and has greater affinity for resin so as not to remain in the media. They looked for a combination of solvents with less erosion of a head member and less penetration of media and having greater affinity for resin. As a result of this, the inventors of the present invention found the present invention.

In a first arrangement, a non-water-based inkjet ink is provided containing a colorant, characterized in that a mixed solvent having a solubility parameter (sp) value of from about 8 to about 10 is used as a solvent.

In a second arrangement, a non-water-based inkjet ink is provided in which the mixed solvent is one or a mixture of two or more selected from solvents represented by the following general formulas:

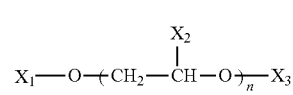

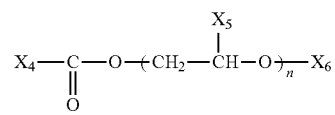

in the above formulas (1), (2), each of $X_1$ through $X_6$ is H or an alkyl group, and n is 1 or 2.

In a third arrangement, a non-water-based inkjet ink is provided in which the mixed solvent is a combination of solvents, i.e. diethylene glycol hexylether and propylene glycol monomethyl ether acetate.

In a fourth arrangement, a non-water-based inkjet ink is provided in which the inkjet ink contains vinyl chloride-vinyl acetate copolymer resin as a resin.

According to embodiments of the present invention, there is provided a non-water-based inkjet ink having good drying property to reduce the possibility of blocking while preventing penetration of material of media.

This, in the first arrangement, a non-water-based inkjet ink is provided as an ink containing a colorant and is characterized in that a mixed solvent having a sp (solubility parameter) value of from about 8 to about 10 is used as a solvent.

The mixed solvent is a combination of solvents having greater affinity for resin (for example, vinyl chloride-vinyl acetate copolymer resin).

The sp value is a measurement value indicating the solubility of a solvent of two-component system. It is empirically known that the smaller the difference in sp value between two components is, the greater the solubility is.

Examples of the mixed solvent having a sp value of from about 8 to about 10 include a mixture of two or more selected from a group of solvents consisting of solvents represented by formulas (1), (2) as will be described later, diethylamine (sp value of 8.0), cyclohexane (sp value of 8.2), sec-butyl acetate (sp value of 8.2), dichlofluoromethane (sp value of 8.3), isopropyl acetate (sp value of 8.4), dipentene (sp value of 8.5), 2-heptanone (sp value of 8.5), carbon tetrachloride (sp value of 8.6), propylbenzene (sp value of 8.6), pentylamine (sp value of 8.7), xylene (sp value of 8.8), p-chlorotoluene (sp value of 8.8), butylaldehyde (sp value of 9.0), ethyl acetate (sp value of 9.0), tetrahydrosilane (sp value of 9.1), benzene (sp value of 9.2), styrene (sp value of 9.3), methyl ethyl ketone (sp value of 9.3), benzaldehyde (sp value of 9.4), chlorobenzene (sp value of 9.5), ethylene glycol monobutyl ether (sp value of 9.5), 2-ethyl hexanol (sp value of 9.5), methyl acetate (sp value of 9.6), dichloroethyl ether (sp value of 9.8), 1,2-dichloroethane (sp value of 9.8), acetone (sp value of 9.9), cyclohexanone (sp value of 9.9), 1,4-dioxane (sp value of 10.0), isopentyl alcohol (sp value of 10.0), o-dichlorobenzene (sp value of 10.0), and the like.

It is preferable that the aforementioned mixed solvent is one or a mixture of two or more selected from solvents represented by the following general formulas.

The mixed solvent according to the second arrangement achieves the combination of solvents with less penetration of media. In addition, the mixed solvent achieves the combination of solvents having greater affinity for resin (for example, vinyl chloride-vinyl acetate copolymer resin).

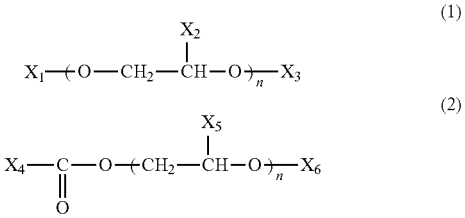

In the above formulas (1), (2), each of $X_1$ through $X_6$ is H or an alkyl group, and n is 1 or 2.

In embodiments of the present invention, polyoxyethylene alkyl ethers having a sp value of from about 8 to about 10 represented by the above formula (1) include diethylene glycol monohexyl ether (e.g., trade name: Hexyldiglycol (HeDG) available from Nippon Nyukazai Co., Ltd.) having a sp value of 9.6, diethylene glycol hexylether having a sp value of 9.2, dipropylene glycol dimethyl ether (e.g., trade name: dimethyl propylene glycol (DMFDG) available from Nippon Nyukazai Co., Ltd.) having a sp value of 8.2, diethylene glycol diethyl ether (e.g., trade name: diethyl diglycol (DEDG) available from Nippon Nyukazai Co., Ltd.) having a sp value of 8.6.

In embodiments of the present invention, polyoxyethylene alkyl ether acetates having a sp value of from about 8 to about 10 represented by the above formula (2) include propylene glycol monomethyl ether acetate (abbr. PMA) having a sp value of 9.2, dipropylene glycol (mono)methyl ether acetate (dipropylene glycol monomethyl ether monomethyl acetate) (abbr. DPMA) having a sp value of 8.71, and ethylene glycol monobutyl ether acetate having a sp value of 8.85.

The aforementioned mixed solvent is preferably a combination of solvents, i.e. diethylene glycol hexylether and propylene glycol monomethyl ether acetate.

This is because it is excellent in effect described in the aforementioned first arrangement.

The aforementioned mixed solvent may further contain a solvent which is polyoxyethylene alkyl ether having a sp value of 10 or less different from the above-listed ones or a solvent of another type having a sp value of 10 or less.

Examples of solvent of another type include olefin solvents and terpene solvents.

In an embodiment of the present invention, the aforementioned inkjet ink preferably contains vinyl chloride-vinyl acetate copolymer resin (hereinafter, referred to as "VCVAC resin") as resin.

This is because using a solvent of a strong type of dissolving the VCVAC resin like the conventional one may cause erosion of a head member and penetration of media.

The present invention is suitably adapted to an inkjet ink as a solvent/oil-based ink containing a solvent and vinyl chloride-vinyl acetate copolymer resin.

The present invention is suitably adapted to an inkjet ink as a solvent/oil-based ink containing vinyl chloride-vinyl acetate copolymer resin as the binder resin, for example.

Examples of the vinyl chloride-vinyl acetate copolymer resin include VYNS-3, VYHH, VYHD, VMCH, VMCC, VMCA, VERR-40, VAGH, VAGD, VAGF, and VROH manufactured by The Dow Chemical Company, SOLBIN C, SOLBIN CL, SOLBIN CH, SOLBIN CN, SOLBIN C5, SOLBIN C5R, SOLBIN M, SOLBIN ML, SOLBIN TA5R, SOLBIN TAO, SOLBIN MK6, SOLBIN TA2 and so on manufactured by Nisshin Chemical Industry, Co., Ltd.

The oil-based inkjet ink according to an embodiment of the present invention preferably contains a colorant and a binder resin which are suitably dissolved or dispersed in the solvent together with the dispersant (e.g., see international publication no. WO2004-007626).

As a method of producing the oil-based inkjet ink, a solvent or a mixed solvent is prepared as the solvent of ink composition. A pigment and a dispersant are added into a part of the solvent and are mixed and dispersed by a ball mill, a bead mill, an ultrasonic mill, or a jet mill so as to obtain a pigment dispersed liquid. The residual of the aforementioned solvent, a binder resin, and other additives are added into the obtained pigment dispersed liquid while being stirred, thereby producing the ink composition.

In the aforementioned ink composition, the binder resin is preferably vinyl chloride-vinyl acetate copolymer resin. Another binder resin of rosin series, acrylic series, polyester series, or urethane series may be used together with the vinyl chloride-vinyl acetate copolymer resin.

A stabilizer such as an oxidation inhibitor and an ultraviolet absorber, a surface acting agent may be added into the aforementioned ink composition. As the oxidation inhibitor, BHA (2,3-butlyl-4-oxyanisol), BHT (2,6-di-t-butyl-p-cresol) may be employed and its amount is of from 0.01% to 3.0% by weight relative to the oil-based ink composition. As the ultraviolet absorber, a benzophenone compound or a benzotriazole compound may be employed and its amount is of from 0.01% to 0.5% by weight relative to the oil-based ink composition.

In addition, as the surface acting agent, any of anionic, cationic, and amphoteric or nonionic surface acting agents may be employed and its amount is of from 0.5% to 4.0% by weight relative to the oil-based ink composition.

In the embodiment of the present invention, a solvent of a strong type such as NMP (N-methylpyrrolidone) solvent, a lactone solvent, and cyclohexane is not used for dissolving the VCVAC resin (not contained in ink).

EXAMPLES

Hereinafter, embodiments of the present invention will be specifically described with reference to examples. However, the present invention is not limited these examples.
Preparation of Solvent The following solvents were used as the solvent:

(I-1) Diethylene glycol monohexyl ether (trade name: Hexyldiglycol (HeDG) available from Nippon Nyukazai Co., Ltd.);

(I-2) Dipropylene glycol dimethyl ether (trade name: dimethyl propylene glycol (DMFDG) available from Nippon Nyukazai Co., Ltd.);

(II-1) Propylene glycol monomethyl ether acetate (abbr. PMA);

(II-2) Dipropylene glycol (mono)methyl ether acetate (dipropylene glycol monomethyl ether monomethyl acetate) (abbr. DPMA);

(II-3) Propylene glycol monomethyl ether propionate (abbr. PMP).

Preparation of Resin Solution I and Evaluation

Mixed solvents HeDG+DPMA (1:1) (Example 1), HeDG+PMP (1:1) (Example 2), and HeDG+PMA (1:1) (Example 3) were prepared. 10 parts by weight of VCVAC resin (VYHH, VYHD, VAGH available from Dow Chemical Company, SOLBIN TA5R, C5R available from Nisshin Chemical Industry, Co., Ltd.) was added into 90 parts by weight of each mixed solvent while being stirred and then was dissolved by a stirrer (three-one motor available from Shinto Scientific Co., Ltd.) while being warmed at about 50° C. for 1 hour by a water bath.

After 1 hour, it was observed whether or not the VCVAC resin was dissolved. At this point, the VCVAC resin was completely dissolved in all of the combinations (mixed solvent—VCVAC resin).

Inkjet inks were prepared using the resin solutions of the examples by adding colorant and the like and were ejected by inkjet printers. Printing was possible without problems. Little penetration of media was found and good drying property (allowing media to be wound because of no bleed, good non-blocking property) was obtained.

Respective evaluation results about solubility, penetration of media, winding, blocking, ink clogging are also shown in Table 1, where "○" indicates satisfactory results and "Δ" indicates unsatisfactory results.

Comparative Example 1

Resin solution was prepared in the same manner as the aforementioned example except that mixed solvent of N-methyl-2-pyrrolidone (NMP)+DMFDG+DPMA (10:45:45) was used as the solvent.

As a result, it was found that the head member was eroded so as to cause problem such as life shortening of the head and decline in printing quality because N-methyl-2-pyrrolidone is a strong solvent. It was also found that the solvent such as N-methyl-2-pyrrolidone has a tendency to remain in media so as to cause another problem such as penetration of the media and reduction in drying property.

Respective evaluation results about solubility, penetration of media, winding, blocking, and ink clogging are also shown in Table 1.

Comparative Example 2

Resin solution was prepared in the same manner as the aforementioned example except that mixed solvent of γ-butyrolactone+DMFDG+DPMA (10:45:45) was used as the solvent.

Respective evaluation results about solubility, penetration of media, winding, blocking, and ink clogging are also shown in Table 1.

As shown in Table 1, penetration of media and blocking were observed.

Comparative Example 3

Resin solution was prepared in the same manner as the aforementioned example except that mixed solvent of DMFDG+DPMA (1:1) was used as the solvent.

Respective evaluation results about solubility, penetration of media, winding, blocking, and ink clogging are also shown in Table 1.

As shown in Table 1, ink clogging was observed.

TABLE 1

| | Resin solution | Solubility | Penetration of media | Winding | Blocking | Ink clogging |
|---|---|---|---|---|---|---|
| Ex. 1 | HeDG + DPMA | ○ | ○ | ○ | ○ | ○ |
| Ex. 2 | HeDG + PMP | ○ | ○ | ○ | ○ | ○ |
| Ex. 3 | HeDG + PMA | ○ | ○ | ○ | ○ | ○ |
| Comp. Ex. 1 | NMP + DMFDG + DPMA | ○ | Δ | ○ | Δ | ○ |
| Comp. Ex. 2 | Y-butyrolactone + DMFDG + DPMA | ○ | Δ | ○ | Δ | ○ |
| Comp. Ex. 3 | DMFDG + DPMA | ○ | ○ | ○ | ○ | Δ |

What is claimed is:

1. A non-water-based inkjet ink containing a colorant, wherein a mixed solvent having a solubility parameter value of from about 8 to about 10 is used as a solvent,
   wherein said mixed solvent is one or a mixture of two or more selected from the group consisting of solvents represented by the following general formulas:

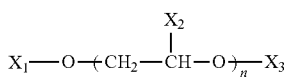
(1)

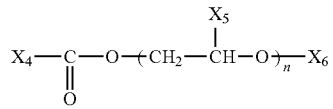
(2)

in the above formulas (1), (2), each of $X_1$ through $X_6$ is H or an alkyl group, and n is 1 or 2,
   wherein said mixed solvent is a combination of solvents, and
   wherein said combination of solvents is diethylene glycol hexylether and propylene glycol monomethyl ether acetate.

2. The non-water-based inkjet ink as claimed in claim 1, wherein said inkjet ink contains vinyl chloride-vinyl acetate copolymer resin as a resin.

* * * * *